United States Patent [15] 3,636,258

Brumbach [45] Jan. 18, 1972

[54] COMMUNICATION SYSTEM HAVING SIGNAL STORAGE

[72] Inventor: Joseph F. Brumbach, Niles, Ill.

[73] Assignee: Victor Comptometer Corporation, Chicago, Ill.

[22] Filed: Feb. 20, 1969

[21] Appl. No.: 800,964

[52] U.S. Cl. ....................178/6.6 A, 178/19, 325/45, 325/49

[51] Int. Cl. ....................G03c 21/00, H03d 7/16, H04n 1/28

[58] Field of Search....................178/6.6 A, 19; 325/45, 49, 325/345

[56] References Cited

UNITED STATES PATENTS

| | | | |
|---|---|---|---|
| 2,668,283 | 2/1954 | Mullin | 178/6.6 A |
| 2,914,610 | 11/1959 | Leitner | 178/19 |
| 3,334,300 | 8/1967 | Pischke | 325/45 |
| 3,423,528 | 1/1969 | Bradshaw | 178/19 |
| 3,470,473 | 9/1969 | Gilman | 325/45 |
| 2,965,717 | 12/1960 | Bell | 325/49 |
| 3,305,782 | 2/1967 | Rosenberg | 325/345 |

*Primary Examiner*—Howard W. Britton
*Attorney*—Davis, Lucas, Brewer & Brugman

[57] ABSTRACT

A communication system in which frequency-modulated intelligence signals are stored on magnetic tape for subsequent retransmission to one or more receivers. Errors in the recorded signals, introduced by inherent defects of the recording mechanism, are effectively compensated by recording subnormal frequency signals derived from the intelligence signals. During playback the recorded signals are reconverted to original frequencies for transmission to the receiver.

2 Claims, 2 Drawing Figures

Figure 1:
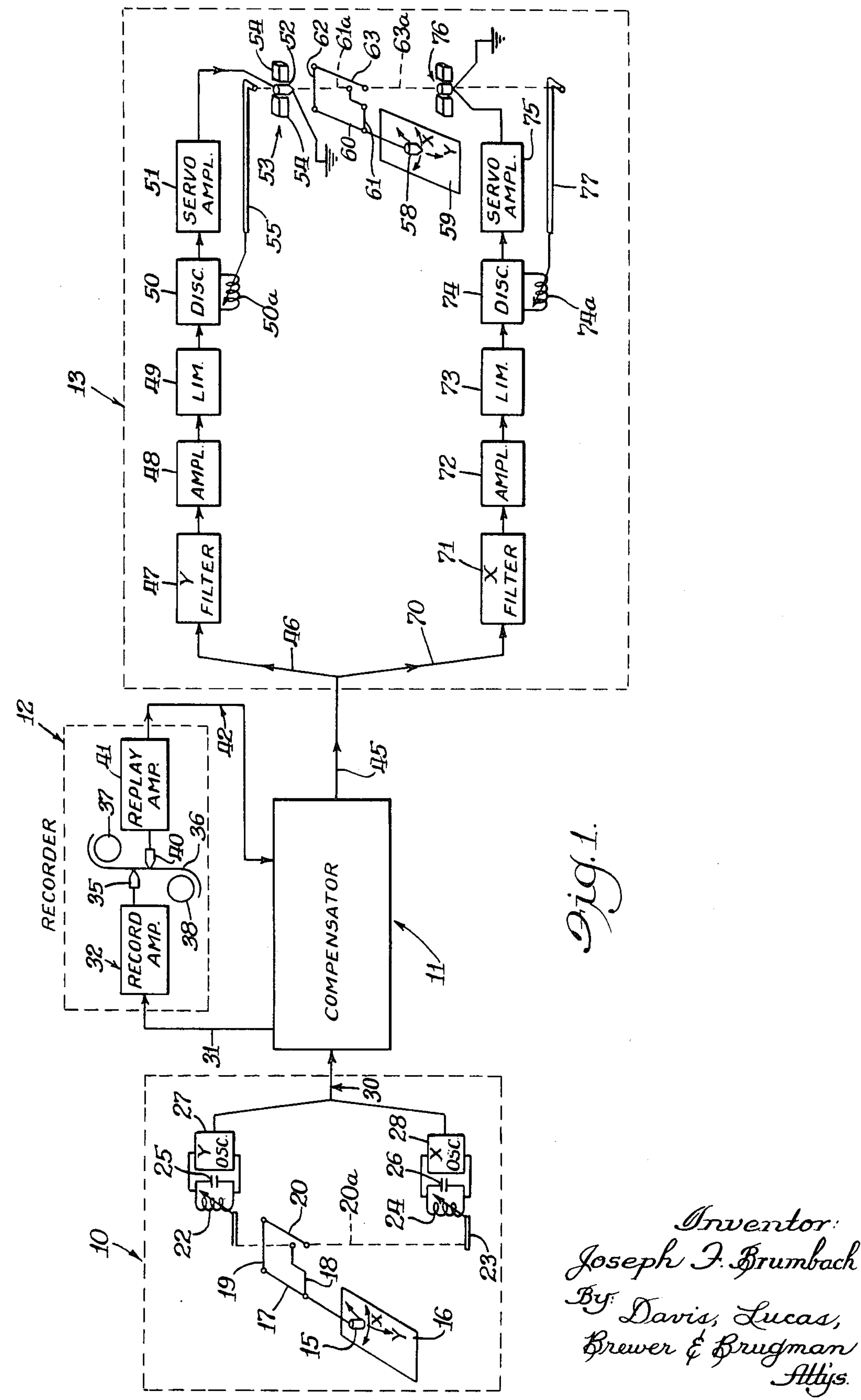

Inventor:
Joseph F. Brumbach
By: Davis, Lucas,
Brewer & Brugman
Attys.

PATENTED JAN 18 1972 3,636,258

Inventor:
Joseph F. Brumbach
By: Davis, Lucas, Brewer & Brugman
Attys.

COMMUNICATION SYSTEM HAVING SIGNAL STORAGE

This invention relates generally to frequency modulated communication systems and more particularly to improved means for correctively compensating recorded signals for errors introduced by magnetic recording means.

According to known practice, graphic intelligence, such as handwriting, sketches and similar information, may be converted to frequency-modulated intelligence signals which are then transmitted to one or more remote receiving stations at which the original intelligence is graphically reproduced in essentially original form. Typifying such known systems is that disclosed in U.S. Pat. No. 3,038,960 issued June 12, 1962.

In such systems, any significant error in the transmitted intelligence signals must be eliminated or compensated for prior to reproducing the signal data in the form of graphic intelligence at the receiving station. Otherwise, inaccurate or unintelligible information may result. While this type of graphic communication has been widely practiced for some time, recent events have made it particularly desirable to store such intelligence signals for subsequent replay and use. One of the more readily apparent procedures for achieving this function is by magnetically recording the signals, as on magnetic tape or a similar recording medium. Despite the relatively advanced state of the recording art however, it is well recognized that errors in frequency, phase and/or amplitude usually occur in recordings produced by even the best of today's commercially available magnetic recording equipment. Though such errors may not seriously affect recordings in the sonic range of frequencies, for example, this is not true when recording frequency modulated signals of relatively high frequency and narrow deviation, prevalent with the class of graphic communication systems hereinabove referred to. To the contrary, recorder introduced errors, referred to as "wow" and "flutter" errors, not only are undesirable in such graphic communication systems, but must be avoided if faithful reproduction of the original graphic intelligence is to result at the receiving stations.

This invention therefore is concerned with correctively compensating magnetically recorded signals for recorder introduced errors.

In brief, this invention, as typified by the hereinafter described embodiment, comprises graphic communication systems in which frequency-modulated intelligence signals, generally in the form of data signals representing graphic coordinates for example, are generated at a transmitting station and then magnetically stored whereby the signal intelligence is reduced to a retrievable record capable of repeated use at one or more receiving stations, independently of the initiating transmitting station. Inasmuch as the magnetic recorders are subject to inherent mechanical imperfections, the use of such equipment for storing the signal intelligence introduces errors which produce deviations in the frequency of the recorded signals. These deviations however, for a given speed of the recording medium past the recording head, are absolute with respect to time. Thus as the frequency of the recorded signals is decreased (time per cycle increased) deviations due to recorder error are proportionately reduced in the recorded signals. In recognition of this concept, the present invention converts the frequencies of the data signals by means utilizing heterodyne principles, to provide lower frequency signals which are magnetically recorded along with the recorder introduced deviations. During playback, the recorded signals are reconverted to the original transmitted signal frequencies. By utilizing heterodyne principles to convert the recorded signals to original frequencies, recorder introduced deviations are not multiplied with increase in frequency, but remain constant and thus are proportionately reduced in the resultant higher frequencies utilized for driving the receiver.

It is an important object of this invention to provide an improved communication system in which magnetically recorded frequency-modulated signals are effectively compensated for recorder introduced errors.

Another important object of this invention is to provide a graphic communication system comprising magnetic signal storage means and improved means for effectively minimizing recorder introduced errors to acceptable levels prior to reproducing graphic intelligence therefrom.

It is a further object of this invention to provide improved means for magnetically recording frequency-modulated signals of narrow deviation and for accurately retrieving the signal intelligence with minimum distortion.

A still further object of this invention is to provide a simplified system employing heterodyne principles, for correcting magnetically stored frequency-modulated signal intelligence.

Having thus described this invention, the above and further objects, features and advantages thereof will become apparent to those familiar with the art from the detailed description of the preferred embodiment thereof which illustrated in the accompanying drawings:

IN THE DRAWINGS

Figure 2:
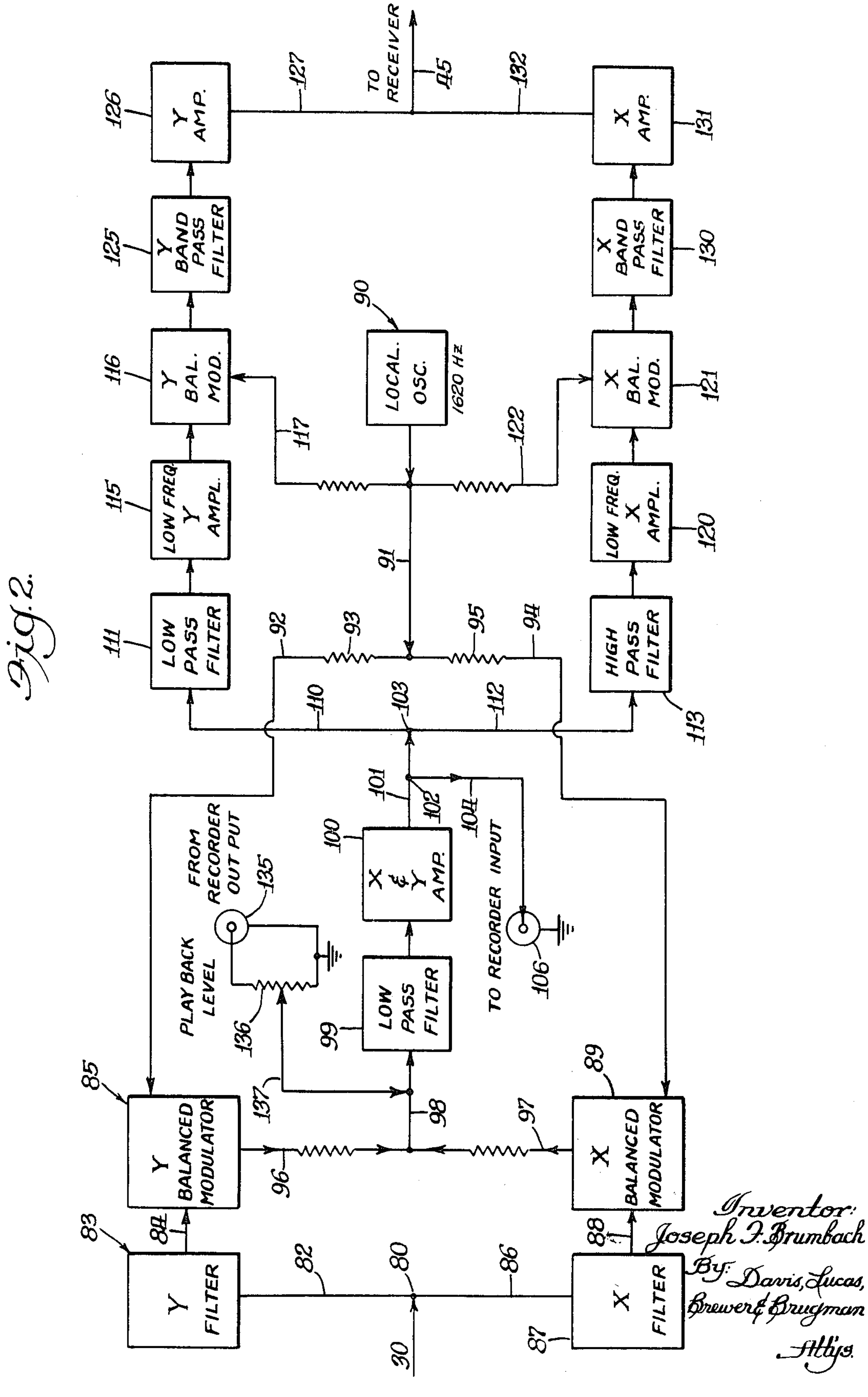

FIG. 1 is a schematic circuit diagram of a communication system according to this invention; and FIG. 2 is another schematic circuit diagram of the error compensator employed in the system of FIG. 1.

Turning now to the features of the preferred embodiment of this invention illustrated in the accompanying drawing, reference is made initially to FIG. 1. As therein shown a graphic communication system of this invention comprises a transmitting section 10, a compensator section 11, a recorder section 12, and a receiving section 13.

The transmitting section 10 includes a mechanical stylus 15 by which a message or other form of graphic intelligence is written or drawn on a recording medium such as paper, supported on surface 16; the stylus moving along X- and Y-coordinates as indicated. The X- and Y- coordinate movement of the stylus 15 is transmitted to a parallelogram linkage by a rigid arm 17 and pivotally connected links 18, 19 and 20; links 18 and 20 being pivotal about coincident axes 18*a* and 20*a*, respectively. Link 18 is mechanically coupled with arm 21 and thereby to the movable element of a variable inductance 22 such that movement of the link 18 causes related variation of inductance 22.

In a similar fashion pivotal link 20 is connected by arm 23 to variable inductance 24 so that pivotal movement of link 20 causes corresponding alteration of inductance 24. It will be appreciated that movement of the stylus 15 along the X-axis over the recording surface 16, produces pivotal movement of link 20 and consequent variation of inductance coil 24 while movement of the stylus along the Y-axis produces corresponding pivotal movement of link 18 and related variation of inductance 22.

The variable inductance coils 22 and 24 in combination with parallel circuited fixed capacity condensers 25 and 26, respectively, provide resonant circuits for controlling the output frequency of the two illustrated oscillators 27 and 28, which in FIG. 1 are respectively labeled "Y-oscillator" and "X-oscillator" The frequencies generated by each of these oscillators is determined by the position of the stylus 15 along the respective Y- and X-axes. The output signals of the two oscillators 27 and 28 therefore constitute coordinate data signals reflective of the coordinate graphic position of stylus 15 which are transmitted over a suitable network, labeled 30 in FIG. 1, to the compensator section 11.

The components of compensator section 11 are best illustrated in FIG. 2 of the drawings and will not be described in detail at this time, other than to indicate overall functioning. In brief, data signals produced by the X- and Y-oscillators and received from the network 30 are converted by compensators 11 to appropriate subnormal frequency signals. Such lower frequency signals are then fed to the recorder section 12 over conductor 31. As the signals are being recorded, they also pass through the compensator directly to the receiver section 13 which may include monitoring means (not shown) for purposes of evaluating the recording program.

As schematically set forth in FIG. 1, the recorder section 12 comprises an amplifier 32 which amplifies the incoming subnormal frequency recording signals produced by the compensator section 11. These amplified signals are fed to a recording head 35 for recording on magnetic tape 36 movable therebeneath and between reels 37 and 38, according to familiar practice. In this fashion the graphic data signal intelligence, produced in accordance with the movements of the stylus 15 at the transmitting section, is effectively conditioned and recorded for subsequent replay from the magnetic tape. As will be explained in greater detail hereinafter, the reduction of normal signal frequencies of the X- and Y-coordinate data signals for recording by section 12 produces signal intelligence in which the relatively fixed deviation errors, per unit of time, effected by the recording equipment, produce relatively smaller deviations in the frequency of the recorded signals than if the original high-frequency data signals were recorded.

At playback of the tape, for retransmission to additional receiver stations, either directly or over intervening transmission circuitry, the recorder section 12 is conditioned for playback and the tape 36 appropriately played over a conventional pickup head 40 which feeds the recorded signals through a replay amplifier 41 for transmission over circuit network 42 to the compensator section 11.

Recorded signals returned to the compensator from the pickup head 40 over network 42 are reconverted, in accordance with heterodyne principles, as will be discussed hereinafter, to the original X- and Y-data signal frequencies and then fed over transmission circuit 45 to one or more receiver sections 13, as the case may be. Inasmuch as the recorder introduced errors in the recorded subnormal frequency signals are constant, as above-mentioned, heterodyne reconversion of such subnormal frequency signals to their original frequencies does not multiply recorder introduced errors, but instead such remain relatively constant. Thus, recorder-generated frequency error in the reconverted higher frequency signals are effectively reduced prior to driving the receiver section 13 as compared to a direct recording of such higher frequency signals.

At the receiver section 13, the data signals are fed over branch circuit conductor 46 to a Y-signal filter 47 capable of excluding all frequencies except the Y-data signal frequencies. After the Y-data filter the signals are conducted successively through amplifier 48, limiter 49 and discriminator 50. Discriminator 50 produces a direct current voltage whose magnitude is a function of the frequency of the Y-data signals input from limiter 49. A variable inductance 50*a* comprising a motor transformer winding is operatively coupled with discriminator 50 to alter the latter's resonant frequency. It is to be noted that the Y-signal discriminator 50 produces output signals which are fed to a servo amplifier 51 for actuating a rotor 52 of a DC servomotor 53 having field magnets 54, 54 so that the motor is driven in response to the Y-data signals. Motor 53 operates pivotal linkage 55, coupled to the motor rotor 52, to accordingly vary the inductance 50*a* responsively with the rotor movements and the positioning of the graphic recording stylus 58 along the Y-axis. Stylus 58 moves over an underlying recording medium supported on surface 59, through a parallelogram linkage system which includes a rigid stylus arm 60 and pivotal links 61, 62 and 63 operatively organized in the same manner as that employed in the described linkage system at the recorder section 10.

More specifically rotor 52 of the Y-position motor 53 is mechanically coupled to link 55 associated with the transformer coil 50*a* and also to link 63 which is pivotally associated with the stylus arm 60. In this fashion the two links 55 and 63 move about their common axis 61*a* when the rotor 52 rotates through a given angle in response to driving signals from servoamplifier 51. Simultaneously link 55 moves to change the inductance of coil 50*a* according to the movement of the rotor 52 and link 61 to bring about a corresponding change in the resonant frequency for the discriminator 50. Within a predetermined band or range of Y-signal frequencies, there is a corresponding value of inductance for the transformer winding 50*a* which results in a zero or resonant signal output from the discriminator 50. Thus, the discriminator produces a zero signal to arrest movement of the rotor and stylus beyond a designated position in response to any given Y-data signal.

In a similar fashion, the X-data signals fed to receiver section 13 over transmission circuit 45 are fed to branch conductor 70 and pass successively through X-signal filter 71, amplifier 72, limiter 73, X-signal discriminator 74 and servoamplifier 75. Amplifier 75 drives an X-signal servomotor 76 for pivotally actuating the stylus linkages 63, 62 and 60, causing the stylus 58 to move along its X-axis over the recording medium supported on the receiver writing surface 59. Simultaneously linkage 77 is driven with linkage 63 about axis 63*a* by motor 76 to vary the inductance 74*a* associated with discriminator 74. This resonates the X-signal discriminator and graphically positions the stylus 58.

The aforedescribed system for graphically transmitting X- and Y-coordinate data signals to remote receiver stations whereat the same are graphically reproduced is fully known, and except for the compensator and recorder sections 11 and 12 of the present combination U.S. Pat. Nos. 2,583,720 issued Jan. 29, 1952 and 2,631,198 issued March 10, 1953 may be referred to for more detailed descriptions of graphic communication systems of the order above referred to.

Turning now to the particulars of the novel compensator section 11 hereof, reference is made to FIG. 2 of the drawings wherein the component arrangement involved in this section is schematically set forth.

As previously noted, the data signal output of transmitter section 10 is fed over network 30 and Y- and X-signal input terminal 80, at the compensator section. Terminal 80 leads to individual series tuned circuits of similar order.

Specifically the Y-signals at terminal 80 are fed over conductor 82 to a Y-signal filter 83 which is coupled by conductor 84 in series with a Y-balanced modulator 85. Similarly, the X-input terminal 80 feeds the X-data signals over conductor 86 to an X-signal filter 87 coupled by conductor 88 in series with an X-balanced modulator 89.

A local oscillator 90 is coupled to the Y-balanced modulator 85 over a network including conductors 91, 92 and resistance 93, and to the X-balanced modulator 89 by a network including conductors 91, 94 and resistance 95. Thus, the output of he local oscillator 90 is mixed with the graphic data signal input to both of the balanced modulators 85 and 89. Mixing the data and local oscillator signal frequencies produces resultant frequency signals, selected as the "difference frequencies" of the mixed signals, which then form the respective output signals of the balance modulators 85 and 89.

Such difference frequency signal outputs of the two balanced modulators 85 and 89 are resistance coupled over circuits 96 and 97, respectively, to conductor 99 leading to a low-pass filter 99 which in turn is coupled to an X- and Y-signal amplifier 100. The output of amplifier 100 is fed over conductor 101 to a first junction 102 and a second junction 103.

Junction 102 is joined by conductor 104 to an output jack 106 which is patched selectively to the input jack of the recorder section, by the circuit conductor 31. This patch circuit is used only if the signals at junction 102 are to be stored by recorder section 12.

Junction 103 is joined by conductor 110 with a low-pass filter 111 of a Y-signal conversion circuit and by conductor 112 to a high-pass filter 113 of a parallel X-signal conversion circuit.

Low-pass filter 111 is designed to pass only the difference signals representative of the Y-data signals resulting from mixing the output of the local oscillator 90 with the input to the Y-balanced modulator 85. Correspondingly, high-pass filter 113 passes only the difference frequency signal output of the X-balanced modulator 89 and oscillator 90, representative of the X-data signals. Thus, the two filters 111 and 113 effectively separate into individual parallel networks the respective Y- and X-low or difference frequency signals produced by heterodyning the local oscillator signals with the data signals as above explained.

Low-pass filter 111 is coupled in series to a low-frequency Y-amplifier 115 whose output is fed to a Y-balanced modulator 116, which also receives the output of local oscillator 90 over circuit conductors 91 and 117. The low-frequency input signal to the modulator 116 thus is intermixed with the output of the local oscillator 90, to heterodyne the low-frequency output of the Y-amplifier 115 and produce frequencies inclusive of the original Y-data signals originating from the graphic transmitter section 10.

In a similar fashion the high-pass filter 113 is coupled to a low-frequency X-amplifier 120 joined in series with an X-balanced modulator 121. Like the Y-balanced modulator 116, modulator 121 also receives the output of the local oscillator 90, over conductors 91 and 122. The intermixing of the frequency output of the local oscillator 90 with the low-frequency signal input from amplifier 120 produces resultant signals which include the original graphic data signal frequencies of the X-data signal output of the transmitter section 10.

It will be recognized from the description appearing hereinabove, that both the Y- and X-signals fed into balanced modulators 116 and 121, respectively, are reconverted in accordance with known heterodyne principles into signals having frequencies which include the original graphic data signals produced by the transmitter section.

In order to recover the original Y-data signal frequencies, the output of the Y-balanced modulator 116, is coupled to a Y-band-pass filter 125 which filters out all frequencies except those lying within the original band or range of frequencies representative of the Y-graphic data signals. The output of filter 123 is then amplified by Y-amplifier 126 and fed over conductor 127 to the compensator section output network 45 leading to receiver section 13.

In a corresponding fashion the output of the X-balanced modulator 121, which includes the original X-data signal frequencies produced by the transmitter section, is fed to an X-band-pass filter 130, which effectively blocks or eliminates all frequencies except those within the band or range of frequencies of the X-data signals originated by transmitter section 10. Signals passing filter 130 are then amplified in X-amplifier 131 and fed over conductor 132 to network 45 leading to the receiver section 13.

To better appreciate the workings of the aforedescribed compensator section 11, an illustrative case, setting forth typical circuit parameters and operations will now be described.

Graphic data signals, produced in section 10, typically are in the order of 1,310 Hz. to 1,490 Hz. for the Y-data signals and 2,060 Hz. to 2,340 Hz. for the X-data signals. The Y and X-series filters 83 and 87 in the compensator section accordingly are selected to pass frequencies in the order of 1,310–1,490 Hz. and 2,060–2,340 Hz. respectively.

Local oscillator 90 is adjusted to produce a signal of constant frequency, in the order of 1,620 Hz. Low-pass filter 99 is selected to pass "difference" frequency signal up to 720 Hz. emanating from the two balanced modulators 85 and 89.

The low-pass filter 111 in the Y-conversion circuit operates to cut off frequencies greater than 310 Hz. while the high-pass filter 113 in the X-conversion circuit is set to cut off frequencies below 340 Hz.

The Y- and X-band-pass filters 125 and 130 are designed to pass the original Y- and X-data signal frequencies of 1,310–1,490 Hz. and 2,060–2,340 Hz. respectively.

For simplification only the mid or "center frequency" values of the respective data signals produced by transmitter section 10 need be considered as the input frequencies to compensator section 11 for illustrative purpose.

Mixing the output of the local oscillator 90 with such "-center frequency" input signals produces "difference frequency" signals as follows:

| | |
|---|---|
| 2,200 Hz. | (X input midfrequency) |
| −1,620 Hz. | (Local oscillator frequency) |
| 580 Hz. | (X difference frequency) |
| 1,620 Hz. | (Local oscillator frequency) |
| −1,400 Hz. | (Y input midfrequency) |
| 220 Hz. | (Y difference frequency) |

The above indicated two lower "difference frequency" signals appear at the output of the low-pass filter 99 (720 Hz. cutoff) and are fed to the X- and Y-amplifier 100 whose output is coupled to the compensator output jack 106, as well as to the Y-low-pass filter 111, and the X-high-pass filter 113 of the parallel conversion circuits.

If it is desired to record such "difference frequency" signals, the compensator output jack 106 is patched to the input of the recorder section 12 and the latter conditioned to record such signals on magnetic tape or the like, as previously described.

The signal path to the monitor receiver while recording is from junction 103 through the Y- and X-conversion circuits wherein the low-pass filter 111 accepts only the Y "difference signal" frequencies below 310 Hz. and correspondingly the high-pass filter 113 passes only the X "difference frequency" signals above 340 Hz. Thus, the X and Y "difference freqency" recording signals are effectively separated, amplified by the respective amplifiers 115 and 120 and fed into the X- and Y-balanced modulators 116 and 121, respectively, whereat the same are mixed with the fixed frequency signal output of the local oscillator 90. This produces frequencies containing the originally transmitted data signal frequencies as follows:

| | |
|---|---|
| 580 Hz. | (X difference frequency) |
| +1,620 Hz. | (Local oscillator frequency) |
| 2,200 Hz. | (X sum frequency) |
| 1,620 Hz. | (Local oscillator frequency) |
| +220 Hz. | (Y difference frequency) |
| 1,400 Hz. | (Y difference frequency) |

It will be noticed that the selected X "sum frequency" of 2,200 Hz. matches the midfrequency input originally fed to the X-balanced modulator 89. On the other hand the Y "difference freqncy" of 1,400 Hz. is utilized as such corresponds to the original midfrequency signal input to the Y-balanced modulator 85.

The outputs of the Y- and X-balanced modulators 116 and 121 are then respectively fed to the Y-band-pass filter 125 (1390–1490 Hz. and to the X-band-pass filter 130 (2060 to 2,340 Hz. After filter 125 the Y-signals are amplified and fed to the receiver section 13 over the circuit network 45. In like fashion the X-signal output of band pass filter 130 is amplified in X-amplifier 131 and fed to the receiver section 13.

It will be recalled that one of the principal objectives of this invention is to depress or minimize the deviations in magnetically stored signals, introduced by mechanical deficiencies or errors in the recording equipment. To illustrate the advantage of the described conversion and reconversion program, heterodyne utilizing principals, according to the present invention, let us assume, by way of example, that recorder section 12 has a deviation error or "jitter" of ±1 millisecond. It will be appreciated that this error corresponds to a 1 Hz. error at 1,000 Hz. On the other hand, such error amounts to only a 1/10 Hz. at 100 Hz. Therefore, if the original data signal frequencies are converted to lower frequencies, as above described, while maintaining the same frequency deviation error of the recording equipment, there is a resulting smaller frequency disturbance in the recorded signals due to the mechanical defect of the tape-recording mechanism. This principle. is incorporated in the present invention, as above described, by recording the lower frequencies in recorder section 12.

When it is desired to retrieve such recorded intelligence, the magnetic tape is played back in the recorder section and the recovered signals fed over conductor 42 to the input jack 135 of the compensator section 11. A suitable playback level control 136 is in circuit with jack 135 and conductors 137 and 98 leading to the input side of low-pass filter 99 in compensator. Such signals thereafter follow the same path through the low-pass filter 99, amplifier 100 and the respective vertical and horizontal conversion circuits, screened by the respective low pass filter 111 and high-pass filter 113, as hereinabove described.

Inasmuch as the recorder deviation in the recorded low-frequency signals is constant with respect to time, converting such recorded signals and errors by mixing the same with the output of local oscillator 90 to produce resultant high frequencies does not multiply the deviations proportionately to the resulting higher frequency signals. Instead such deviations remain at their fixed value, as described. Therefore, the end result is a desired minimization of the recorder introduced deviations in both the horizontal and vertical data signals supplied to the receiver section 13.

From the above it is believed that those familiar with the art will readily recognize and appreciate the novel aspects and features of the present invention which mark the same as an advancement over the prior art. Further, while the present invention has been described in association with a particular preferred embodiment thereof, it is to be recognized that the same is not restricted to the specifics of the described and illustrated example of its teachings, but is susceptible to change, modification and substitution of equivalents without departing from the spirit and scope of this invention.

I claim:

1. A graphic communication system comprising: transmitter means for generating variable frequency modulated data signals in the order of 3,000 Hz. and below representative of graphic intelligence, receiver means receptive of said data signals and operable to graphically reproduce the intelligence represented thereby, recorder means for magnetically recording said data signal intelligence on a moving magnetic recording medium and capable of introducing frequency deviations in signals recorded thereby, and compensator means in circuit with said transmitter means, recorder means and said receiver means for correctively minimizing recorder introduced deviations in signals recorded by said recorder means prior to reproduction of intelligence therefrom by said receiver means, said compensator means comprising heterodyne circuit means for modulating said data signals to subnormal frequencies prior to introducing the same to said recorder means, and additional heterodyne circuit means for modulating signals recorded by said recorder means to original data signal frequencies prior to introducing the same to said receiver means whereby the recorder introduced errors therein are maintained at subnormal values proportional to said subnormal frequencies.

2. The combination of claim 1, wherein said transmitter means generates separate X- and Y-coordinate data signals, and said compensator means separates said X- and Y-data signals and operatively modulates the same by respectively mixing the same with fixed frequency signals to produce said recording signals therefrom and by mixing the latter with said fixed frequency signals to produce signals of data signal frequency having minimized errors.

* * * * *